United States Patent [19]
Andersson

[11] Patent Number: 5,876,524
[45] Date of Patent: Mar. 2, 1999

[54] METHOD FOR THE MANUFACTURE OF TUBES OF A ZIRCONIUM BASED ALLOY FOR NUCLEAR REACTORS AND THEIR USAGE

[75] Inventor: Thomas Andersson, Sandviken, Sweden

[73] Assignee: Sandvik AB, Sandviken, Sweden

[21] Appl. No.: 765,590

[22] PCT Filed: Jun. 20, 1995

[86] PCT No.: PCT/SE95/00749

§ 371 Date: Apr. 17, 1997

§ 102(e) Date: Apr. 17, 1997

[87] PCT Pub. No.: WO95/35395

PCT Pub. Date: Dec. 28, 1995

[30] Foreign Application Priority Data

Jun. 22, 1994 [SE] Sweden .................................. 9402250

[51] Int. Cl.$^6$ ....................................................... C22F 1/18
[52] U.S. Cl. ........................................... 148/672; 148/519
[58] Field of Search ..................................... 148/519, 672

[56] References Cited

U.S. PATENT DOCUMENTS

| | | | |
|---|---|---|---|
| 3,847,684 | 11/1974 | Amick | 148/672 |
| 3,865,635 | 2/1975 | Hofvenstam et al. | 148/672 |
| 4,450,016 | 5/1984 | Vesterlund et al. | 148/672 |
| 4,450,020 | 5/1984 | Vesterlund | 148/672 |
| 4,908,071 | 3/1990 | Anderson et al. | 148/672 |

FOREIGN PATENT DOCUMENTS

| | | | |
|---|---|---|---|
| 0 196 286 | 10/1986 | European Pat. Off. | 148/672 |
| 0 446 924 A1 | 9/1991 | European Pat. Off. | 148/672 |
| 0 475 159 A1 | 3/1992 | European Pat. Off. | 148/672 |

*Primary Examiner*—John Sheehan
*Attorney, Agent, or Firm*—Burns, Doane, Swecker & Mathis, L.L.P.

[57] ABSTRACT

The present invention relates to a method of manufacturing tubes of zirconium based alloys for usage in nuclear reactors. According to the invention one can achieve good resistance towards general corrosion, improved transversal creep strength and reduced irradiation induced growth by subjecting a β-quenched tube a vacuum anneal in the α-phase range at a temperature and a time sufficient to obtain an annealing parameter value A in the range $3.4 \times 10^{-16}$ to $3.4 \times 10^{-13}$.

7 Claims, No Drawings

METHOD FOR THE MANUFACTURE OF TUBES OF A ZIRCONIUM BASED ALLOY FOR NUCLEAR REACTORS AND THEIR USAGE

The present invention relates to a method for the manufacture of tubes of zirconium-based alloys for cladding of nuclear core materials and for the manufacture of skeletons of nuclear elements for usage in nuclear reactors including several successive deformation and annealing steps. The invention in particularly useful but not only for the manufacture of cladding tubes and construction of guide tubes and instrumental tubes for fuel elements in pressurized water reactors (PWR), the cladding and construction tubes of which are manufactured of a zirconium-based alloy.

The most frequently used Zirconium alloys "Zircaloys" sofar are Zircaloy-2 and Zircaloy-4 according to ASTM B 811. These alloys have the following composition:

| Element | Percentage by weight | |
| --- | --- | --- |
| | Zircaloy-2 | Zircaloy-4 |
| Sn | 1.2–1.7 | 1.2–1.7 |
| Fe | 0.07–0.20 | 0.18–0.24 |
| Cr | 0.05–0.15 | 0.07–0.23 |
| Ni | 0.03–0.08 | — |
| Zr | Rest | Rest |

In addition to the fulfillment of the above analysis these alloys should also contain oxygen at amounts between 900 and 1600 ppm, usually 1200±200 ppm for cladding tubes and construction tubes for fuel element skeletons. Commercial Zircaloy-2 and Zircaloy-4 are also used which contain small and well defined amounts of Si and/or C, preferably in amounts of 50–120 ppm Si and 80–270 ppm C.

These zirconium-based alloys are chosen because of their nuclear properties, primarily their small ability of neutron absorption, mechanical properties and their resistance towards corrosion in water and steam at high temperatures. Nevertheless it is important to improve the mechanical properties and the corrosion resistance in order to achieve a longer service life in the reactor and thereby increasing the degree of burn-up. It is of particular interest to be able to reduce the irradiation induced axial growth in construction tubes. Various types of heat treatments of the tubes during their manufacture have been suggested in order to extend their service lives.

It has been common practice to manufacture cladding and construction tubes of Zircaloy-2 and Zircaloy-4 by a process which includes: hot working of an ingot into a solid billet, heating said billet to the beta phase range followed by quenching, so-called beta-quenching, machining to obtain a hollow extrusion tube billet, extruding said tube billet at high temperature within the alfa phase range to an extruded hollow tube followed by reduction thereof in several steps by cold rolling to substantially final dimension whilst subjecting said tube to a recrystallization annealing in vacuum before each cold rolling step. The cold worked tube which substantially has a final dimension is then subjected to vacuum annealing in the alfa phase range or in case of a construction tube is subjected to an additional cold deformation such as rolling or drawing before the final vacuum annealing. The final annealing in vacuuim is performed consisting of a stress-relief, a partial recrystallization or a complete recrystallization. The kind of final vacuum annealing is selected based upon the specification by the fuel manufacturer regarding the mechanical properties for the cladding tubes and the construction tubes.

By "α range" should be understood the temperature range in which the crystalline structure of the alloy is hexagonal and close packed (α phase), and by "β range" the temperature range in which the crystalline structure of the alloy is body centered cubic (β phase). The transition temperature from α phase to β phase of pure zirconium is 862° C.

Zirconium-based alloys have an intermediate range where the two crystalline structures α and β are present. This range, where the Zircaloy-2 and Zircaloy-4 alloy is in the so-called a α+β phase, extends in the temperature range between 800° C. and 950° C.

Various types of different manufacturing methods have been suggested for the purpose of improving the corrosion resistance and/or the mechanical properties such as transversal creep strength, ductility and irradiation induced axial growth. These methods include various steps for heating to the β-phase range followed by quenching, i.e. beta-quenching of a hollow tube after extrusion or β-quenching of cladding or constuction tubes in their final dimension.

U.S. Pat. Nos. 4,450,016 and 4,450,020 describe heat treatment in the β-phase range by beta-quenching the tube billet before the last two cold rolling steps followed by two subsequent cold rolling steps to a final cladding tube with an intermediate vacuum anneal in the α-phase range. Further, Pat. Nos., U.S. Pat. No. 4,279,667, DE 2951102 or DE 2951096 teach the use of a heating method for making construction elements. This β range treatment is only a surface treatment. The above mentioned various methods have all been suggested for the purpose of improving the nodular corrosion resistance in cladding tubes and/or structural parts in an environment representative for boiling water reactors (BWR). It is important to keep in mind that the treatment pursuant to U.S. Pat. Nos. 4,450,016 and 4,450,020 has a tendency of impairing the resistance towards general corrosion which, is the corrosion mechanism that is dominating and which is limiting the life time for cladding tubes and structural parts in pressurized water reactors.

Further it should be noticed that the treatment methods where only surface beta-quenching is performed do not positively affect the irradiation induced axial growth.

U.S. Pat. No. 3,865,635 discloses a method where the beta-quenching is performed before the last cold rolling step in the manufacture of final cladding tubes to achieve improved creep strength throughout the thickness of such tube. This method also positively influences the resistance towards nodular corrosion but has a tendency of negatively affecting the resistance towards general corrosion.

A further method for final heat treatment in the β-phase range on cladding tubes and structural parts is disclosed in EP-A-296 972 where only a surface layer is treated wherein 100% of the wall thickness is heated to the β-range and then quenched. The results thereof indicate improvements in several aspects including bettor resistance towards internal stress corrosion, better resistance towards transversal and axial creep and reduced irradiation induced axial growth. The disadvantage of this treatment method is that the beta quenching, due to the high cooling intensity, gives an over saturation of the elements Fe and Cr in solid solution in the zirconium matrix and also causes precipitation of small secondary phase particles. For the person skilled in the art it is well known that a combination of small secondary phase particles and an over saturation of Fe and Cr contributes to reduced resistance to general corrosion after longer irradiation time periods. A certain improvement in corrosion resistance is initially achieved at shorter burn-out periods as disclosed in EP-A-296 972. However, an impaired consequence is observed at extended burn-outs where good corrosion resistance is of vital importance. The disclosure of Kilp et al: "Proceedings of IAEA Technical Committee Meeting on Fundamental Aspects of Corrosion of Zirconium Alloys in Water Reactor Environments, Vienna 1990, IWGFPT/34" and Garzarolli et al: "ASTM STP1023" advise that in order to achieve optimal resistance it is necessary to have a structure with a depletion of alloying elements in the matrix and with a distribution of large secondary phase particles.

It is an object of the invention to provide a method for the manufacture of tubes of zirconium-based alloys for the cladding of fuel and for structural parts in fuel element skeletons which is better suited than previous methods to satisfy the following requirements in reactors with long usage time periods:

a lower irradiation induced axial growth a higher transversal creep strength in the tubes during irradiation a better corrosion during irradiation, especially after more than 3 years irradiation when corrosion resistance is of vital importance.

The present invention predicts that it is possible to manufacture cladding tubes and structural tube parts of zirconium alloys for nuclear reactors having in combination improved properties in regard of irradiation induced axial growth, transversal creep strength during irradiation and general corrosion even after long time irradiation. These results were not expected.

The invention relates to a method of manufacturing cladding tubes and structural tube parts of zirconium-based alloy in which the zirconium based alloy is subjected to extrusion after which the extruded product is subjected to cold rolling in several steps until final dimension with intermediate vacuum annealing steps in the α-phase range and the final product is subjected to beta-quenching and subsequent vacuum annealing in the α-phase range for making tubes for the cladding of fuel rods and instrumental tubes, and beta-quenching, a cold deformation and a subsequent vacuum annealing in the α-phase range for tubes used as guide tubes for fuel element skeletons.

The extrusion can be performed ar any suitable temperatue in the α-phase range The preferred extrusion temperature lies in the range 550°–750° C.

The intermediate vacuum annealing steps are performed at a temperature in the range 600°–800° C. and preferably at a temperature of 650°–750° C.

β-quenching of the final product is carried out by heating the product to a temperature in the β-base range, suitably a temperature of 950°–1250° C. and preferably a temperature of 1000°–1150° C. during a time sufficient to achieve complete transformation to β-phase followed by quenching to a temperature in the α-phase range. The cooling from the β-phase range to the temperature 700° C. suitably occurs with a cooling rate of 100°–400° C./sec and the cooling from 700° C. to 300° C. or less occurs with a cooling rate of more than 10° C./sec.

The cold deformation after β-quenching at final dimension of structural tube parts for fuel skeletons, which are characterized by subjecting a minor portion of the finally rolled and quenched tubes to a more reduced outer diameter, can be performed by cold rolling or cold drawing with a reduction degree of 5–30%, preferably by cold drawing with a reduction degree of 7–17%.

The final vacuum annealing in the α-phase range on the product after β-quenching in final dimension is performed at a temperature and a time that brings about a product with an annealing parameter value, A, in the range $3.4 \times 10^{-16}$ to $3.4 \times 10^{-13}$, and preferably in the range $6.0 \times 10^{-15}$ to $1.7 \times 10^{-13}$ where A is calculated, by the formula A=t×exp (−Q/RT)

t=annealing time in hours

T=annealing temperature in ° K

R=the general gas constant

Q=activation energy=63000 cal/mole

When manufacturing cladding tubes and structural tube parts according to the invention it has been found that the size of the secondary phase particles in the final product is substantially larger than in the manufacture by known methods where β-quenching of the final product is applied. It is the large particle size obtained with our invention in combination with an alloy element depleted zirconium matrix which brings about the good resistance towards general corrosion. In spite of this structural change at the final vacuum annealing in the α-phase range the obtained improvements in regard of lateral creep strength can be maintained as well as the reduction of the irradiation induced axial growth that is primarily obtained in connection with the β-quenching process.

The zirconium-based alloy is preferably a zirconium-tin-alloy, the so-called Zircaloy-2 and Zircaloy-4 type alloys having the contents of 1.2–1.7% tin, 0.07–0.24% iron, 0.05–0.15% chromium and 0–0.08% nickel, small additions of oxygen, silicon or carbon, the remainder being zirconium and possible impurities wherein the percentage values refer to weight percent.

Zircaloy-2 contains 1.2–1.7% Sn, 0.07–0.20% Fe, 0.05–0.15% Cr and 0.03–0.08% Ni.

Zircaloy-4 contains 1.2–1.7% Sn, 0.18–0.24% Fe, 0.07–0.13% Cr and no Ni.

The invention will now be described in more detail by reference to an example.

An ingot of Zircaloy-4 is forged to a rod with the dimension of 140 mm. The rod is subjected to a conventional β-quenching by heating to a temperature of 1050° C. during 15 min and cooling to room temperature with a cooling speed exceeding 50° C./sec. The rod was processed into a number of extrusion samples. These samples were extruded at a temperature of 650° C., i.e. in the α-phase range. The extruded product was then subjected to 4 cold rolling steps to obtain a tube with an outer diameter of 12.2 mm. After the first, second and third cold rolling steps the cold rolled product was subject of a vacuum annealing step in the α-phase range at a temperature of 720° C. at the first and second step, and a temperature of 700° C. at the third anneal step. The finally rolled product having an outer diameter of 12.2 mm was β-quenched by being subject of induction heating up to 1050° C. during a few seconds having a high frequency induction coil around itself combined with argon gas protection device to protect the outer surface of said tube, whereby the speed of axial displacement of the tube was 0.6 m/min. The product was then subjected to an internal cooling water spraying procedure with an intensity of 200° C./sec down to room temperature. As a result thereof about 50 β-guenched tubes were obtained. These tubes were distributed in two groups. One group, intended to be structural tubes for instruments, were subject of vacuum annealing in the α-range at 500° C. during 5 hours thus giving the tubes an annealing parameter of $3.5 \times 10^{-14}$. This treatment is the same that is also used for making cladding tubes according to the present invention. The other group of beta-quenched tubes, intended as structural tubes type guide tubes, were subjected to a drawing with a reduction degree of 10% along a portion of the length of said tube after which the tubes were vacuum annealed in the α-phase range at 700° C. during 5 hours so as to obtain an annealing parameter of $3.5 \times 10^{-14}$. After the final vacuum anneal in the α-phase range the common treatments for such tubes were performed such as cleaning, straightening, pickling of the internal surface and grinding of the external tube surface after which said tubes were subject of non-destructive ultrasonic testing for the measurement of dimension and for control of possible defects and cleaning and visual surface inspection.

Upon measurement of the size of the secondary particle size it was found that they had a size of 0.1–0.6 μm and an average particle size of about 0.3 μm, i.e. same size as in tubes made by conventional procedures and which, by experience, appear to have good resistance towards general corrosion after long time irradiation in nuclear reactors. Only in the β-quenched condition, i.e. in the state before the last vacuum annealing in the α-phase range at 700° C. during 5 h, the particle size was less than 0.10 μm, i.e. less than what is required to give a sufficiently good resistance towards general corrosion.

At corrosion tests in steam at 400° C. which is a test that is known to simulate the reactor conditions in regard of resistance towards general corrosion, tubes made according to this invention appear with a resistance towards general corrosion being at least equally as good as in conventionally made tubes having documented good resistance towards general corrosion which were included in this test for comparison. After 60 days of exposure at 400° C. tubes made in accordance with the invention had a weight increase of 65–67 mg/dm$^2$ and conventionally made tubes had a weight gain of 67–69 mg/dm$^2$. This weight gain is a measure of the amount of corrosion applied to these tubes.

When subjecting the tubes to creep tests with internal excess pressure corresponding to a peripheral tension of 130 MPa at 400° C. during 240 h, which is a test for measuring transversal creep strength of the tube, tubes made according to the invention appeared to have a transversal creep elongation of 0.45–0.70% whereas conventionally made tubes had a transversal creep elongation of 1.8–2.0%. A low creep elongation value indicates that the tubes made according to the invention have a higher creep strength against thermal creep than those tubes manufactured by conventional practice. In regard of resistance towards irradiation induced growth it is well known to the skilled man that the growth speed is determined by the axial orientation of the α-crystals in the tube, i.e. the tube texture. The texture is determined by X-raying whereby the direction of the base plane of the crystals is determined and visualized by certain texture parameters. The parameter connected with axial growth rate is Kearns factor axially, fa. A higher fa value results in smaller length increase in axial direction of the tube due to irradiation induced growth. Tubes made according to the invention appear to have a fa-value in the range 0.26–0.32 which indicates that a substantially smaller length increase is achieved than compared with conventionally made tubes which appear to have a fa-value of 0.03–0.07.

I claim:

1. A method of making fuel cladding tubes and structural tube parts for fuel skeletons of a zirconium alloy for usage in nuclear reactors, comprising a step of extruding the zirconium alloy into an extruded tube and subjecting the extruded tube to a plurality of cold rolling and α-annealing steps, beta-quenching the cold rolled and annealed tube by heating the entire tube to a temperature in the β-phase range between 950° C. and 1250° C. during a time sufficient to achieve 100% β-phase structure and cooling the tube with a speed between 100° C. and 450° C./sec so as to effect transformation to α-phase throughout the entire tube, and then subjecting the tube to vacuum annealing in the α-phase range at a temperature and time that brings about a value of the annealing parameter A in the range $3.4 \times 10^{-16}$ to $3.4 \times 10^{-23}$.

2. A method according to claim 1, wherein the tubes before vacuum annealing in the α-phase range are subjected to a cold deformation with a reduction degree of 5–30%.

3. A method according to claim 1, wherein the heating in the β-phase range is carried out at a temperature of 1000–1150° C.

4. A method according to claim 1, wherein the heating in the β-phase range is carried out by induction heating in a coil with an axial displacement speed of 0.4–1.0 m/min and the cooling is carried out at 200° C./sec in an argon gas atmosphere.

5. A method according to claim 2, wherein the vacuum annealing in the α-phase range after β-quenching is carried out at a temperature and time so as to achieve an annealing parameter value in the range from $6.0 \times 10^{-15}$ to $1.7 \times 10^{-13}$.

6. A method according to claim 2, wherein the cold deformation before the final vacuum annealing in the α-phase range is carried out by drawing with a reduction degree between 7% and 17%.

7. A method according to claim 4, wherein the axial displacement is about 0.6 m/min.

* * * * *